United States Patent
Schertler

[19]

[11] Patent Number: 6,053,521

[45] Date of Patent: Apr. 25, 2000

[54] LOAD SENSING TRAILER BALL-HITCH DRAWBAR

[76] Inventor: Stephen James Schertler, 135 Olive Branch Rd., Stevensville, Md. 21666

[21] Appl. No.: 09/061,108

[22] Filed: Apr. 16, 1998

[51] Int. Cl.[7] .................................................. B60D 1/24
[52] U.S. Cl. ........................ 280/511; 280/432; 280/422
[58] Field of Search ................... 280/420, 422, 280/432, 449, 511

[56] References Cited

U.S. PATENT DOCUMENTS

| | | | |
|---|---|---|---|
| 3,479,057 | 11/1969 | Miller | 280/511 |
| 4,201,400 | 5/1980 | Hoogenbosch | 280/511 |
| 4,319,766 | 3/1982 | Corteg et al. | 280/511 |
| 4,772,039 | 9/1988 | Cook | 280/415 |
| 4,793,193 | 12/1988 | Burgudd | 73/862.04 |
| 4,864,874 | 9/1989 | Häfner | 73/862.38 |
| 4,889,356 | 12/1989 | Morris | 280/416 |
| 5,040,817 | 8/1991 | Dunn | 280/511 |
| 5,060,965 | 10/1991 | Hafner | 280/504 |
| 5,149,121 | 9/1992 | Häfner | 280/432 |
| 5,159,312 | 10/1992 | Engle | 340/431 |
| 5,434,552 | 7/1995 | Ems | 340/431 |
| 5,438,881 | 8/1995 | Schedrat et al. | 73/862.57 |
| 5,441,293 | 8/1995 | Sturgess | 280/432 |
| 5,522,649 | 6/1996 | Stender et al. | 303/7 |
| 5,855,418 | 1/1999 | Greaves, Jr. | 303/7 |

*Primary Examiner*—Paul N. Dickson
*Assistant Examiner*—Daniel Yeagley

[57] ABSTRACT

A novel load sensing trailer ball-hitch and drawbar mechanism (30) compatible with industry standard coupling, drawbar receivers and vehicle bumper systems consisting of an upstanding elongated vertical ball-hitch post assembly (4) is provided, featuring the integration of a load sensing device (14) therein. The ball-hitch assembly by means of a threaded stud-bolt (20) received into the threaded lower cavity, is to be attached to industry-standard draw-bar or bumper fittings as used on recreational vehicles, trucks and vans. A drawbar (30), has integrated therein a singular or plurality of load sensing devices (14). Overloading of the force measuring device is achieved by means of a mechanical stop fitting (28). Signals derived from this force measuring device are transmitted to a board computer providing an analog or digital representation of the forces acting upon the ball-hitch drawbar assembly.

3 Claims, 6 Drawing Sheets

LOAD SENSING TRAILER BALL-HITCH DRAWBAR

BACKGROUND OF THE INVENTION

1. Field of Invention

This invention relates to a force measuring device incorporated into a towing ball-hitch or drawbar mechanism.

2. Background-Description of Prior Art

When automobiles, trucks or vans are engaged in towing a trailer unit, the most common type of connection used between the towing vehicle and trailer is a ball-hitch or ball-hitch and drawbar coupling. The ball-hitch fitting is attached to either a rear bumper fitting or a horizontally extending drawbar located on the rear of the so-equipped towing vehicle.

The typical ball-hitch is a unitary member having a spherical shape at the upper end and a threaded rod with a nut, or a bolt that threads into the lower end. The threaded nut or bolt is used to secure the ball hitch to the towing drawbar or bumper fitting of the towing vehicle. The drawbar on so-equipped vehicles is further inserted into a drawbar receiver and held in place by means of a retaining pin that may be rounded or rectangular in shape.

The ball-hitch fitting couples to a trailer ball-receiver or coupler fitting, located on the forward-most portion of the trailer's frame or "tongue" of the trailer. It is this "ball & socket" connection that allows for the trailer unit to rotate and pivot freely with respect to the ball-hitch and towing vehicle.

Ball-hitches are manufactured in a variety of industry-standardized sizes dictated by the load they are designed to tow, e.g., a two inch diameter ball-hitch typically has a load rating of 5,000 pounds, while a 2 & 5/16 inch diameter ball-hitch has a load rating of 7,000 pounds. The ball-hitch diameter must also correspond to the interior diameter of the "socket" or coupler receiver on the trailer's tongue fitting.

Once the ball-hitch has been coupled to the receiver or "socket" fitting located on the trailer, energies and forces are then transmitted between towing vehicle and trailer. For example, the static downward force of the trailer's tongue referred to as "tongue weight" would be transferred to the ball hitch and drawbar. Acceleration, deaccleration and lateral forces will also be transferred to the ball-hitch drawbar mechanism acceleration creating a pulling force between a towing vehicle and a towed vehicle and deceleration creating a compressive force between the vehicles.

Tongue weight is one important factor in keeping the coupler securely seated on the ball hitch and influencing whether the trailer will be towed in a balanced and stable manner. Improper tongue weight contributes significantly to unstable and unsafe towing characteristics in both the trailered unit and towing vehicle. For example, too much tongue weight will cause the towed vehicle to pitch downward excessively during deaccleration. Excessive tongue weight also contributes to excessive wear and tear on braking and transmission components. Too little tongue weight may lead to accidental separation of the ball hitch coupler connection and tends to induce pitch and yaw in the towed and towing vehicles. In addition, manufacturers of recreational passenger vehicles, trucks, vans and trailers will provide recommended tongue-weight ranges for their respective vehicles when engaged in towing. Tongue and force loads are the key elements a vehicle manufacturer is considering when determining the maximum towing capacity for any particular vehicle.

For background information relating to prior art pertaining to trailer hitch assemblies and particularly trailer ball hitch drawbar devices, reference may be made to the following U.S. Pat. Nos. 3,479,057; 4,201,400; 4,772,039; 4,864,874; 4,889,356; 5,040,817; 5,060,965; and 5,149,121.

U.S. Pat. No. 5,149,121 discloses a force measuring device wherein a trailer ball hitch component is immersed in an elastomeric material containing pressure sensing devices. A variation shows a modified ball hitch which by means of a 90 degree bend in the ball hitch fitting is attached to a vertical oriented sensing device.

The most obvious drawbacks to these designs are that the force loads and reactions of the trailer unit are transmitted to several non-standard components dramatically increasing the potential for structural failure and compromising the overall strength of the trailer ball hitch mechanism and coupling system. In addition, such previously disclosed devices require substantial modifications to existing standardized drawbar or bumper fittings. Many vehicles currently being manufactured could not be modified for installation of these designs. None afford the convenience of portability nor compatibility with existing industry standard bumper or drawbar receiver fittings. Security of the drawbar mechanism can be assured by the ability to quickly and conveniently remove it from the drawbar receiver. Less obvious shortfalls relate to accuracy and reliability of these designs since they do not provide for direct metal to metal contact between the sensing cell and the forces it is intended to measure. Immersing a load sensing cell in an elastomeric material introduces error factors caused by the static and temperature-altered physical properties of the elastomeric material itself. In addition, deterioration of the elastomeric material further limits the functional life of these designs.

SUMMARY OF THE INVENTION

The present invention is directed toward an improved trailer ball-hitch and drawbar assembly incorporating a force measuring device therein, to be compatible or readily interchangeable with industry standard receivers and mountings and providing convenient and simple operation while maintaining the structural integrity of the ball-hitch drawbar mechanism.

It is an object of the present invention to provide a trailer ball-hitch or drawbar mechanism having integrated therein at least one force measuring device.

It is a further object of this invention that the substantially improved trailer ball-hitch drawbar mechanism of this disclosure is designed and configured to be removable attached to industry standard drawbar receivers extending from towing vehicles or appropriate industry standard bumper fittings of so-equipped towing vehicles. The standard drawbar and bumper fitting are characterized by a vertical opening which passes through them.

It is still a further object of this invention to provide for portability or interchangeability without modification to either industry standard drawbar or bumper fittings.

It is a further object of this invention to provide a mechanism for coupling a trailering vehicle to one that is towed.

It is an additional object of this invention to provide for improved control of towing and towed vehicle.

The trailer ball-hitch drawbar assembly includes an upstanding elongated ball hitch post that has an upper nd a lower end. A threaded "female" cavity is provided on the lower en d into which a threaded stud bolt is received.

Attachment to the drawbar or bumper fitting is achieved by passing the threaded bolt through the vertical opening in the drawbar or bumper fitting and securing the threaded cavity to the threaded bolt. The lower end of the threaded bolt is secured by means of a nut. Additional security may be achieved by the use of a lock washer.

The upper end of the ball hitch assembly is characterized by a generally spherical configuration. Formed within the interior of the upper spherical portion of the hitch post is a small diameter passageway. A circular "T"-shaped cap fitting is seated into this passageway by means of its vertically oriented piston. Once seated, the cap fitting and upper end of the hitch post form a generally spherical unit or "ball". The "T" shaped cap piston is secured in the passageway by means of a spring loaded retaining pin passing through the diameter of the lower piston portion.

The lower end of the "T"-shaped cap piston serves as the contact point transmitting forces acting on the upper surface of the "T"-shaped cap piston directly to the force measuring cell.

The drawbar mechanism is characterized by a generally elongated rectangular shape, it's construction may be solid or of square tube. The drawbar is inserted as a male component into a drawbar receiver a female component which consists of a generally elongated rectangular shape the interior surfaces of which will come into contact with the exterior surfaces of the drawbar. A vertical opening in the drawbar receives a ball hitch studbolt. A lateral open receives a retaining pin which passes through the drawbar and drawbar receiver.

This invention incorporates a convenient and accurate method to measure the forces exerted on a trailer ball-hitch drawbar assembly in both static and dynamic states. The measurement sensor has been incorporated into the trailer ball-hitch drawbar unit.

Signals produced by the measurement sensor are transmitted to a signal processing or recording device for display or continuous monitoring. Accordingly, the objects and advantages of this invention are the integration of a force measuring device into an industry standard ball hitch and drawbar mechanism. This invention provides for a force measuring device that is adaptable without further modification to existing industry standard drawbar and bumper fittings. This invention further affords portability for security and use on multiple vehicles.

This invention provides for superior structural integrity in the ball hitch drawbar mechanism and further provides a more accurate ability to measure forces acting on the ball hitch drawbar mechanism by means of a metal to metal contact with the force sensing device.

Further objects and advantages of my invention will become apparent from a consideration of the drawings and ensuing description.

DETAILED DESCRIPTION OF THE INVENTION

Figure 1:
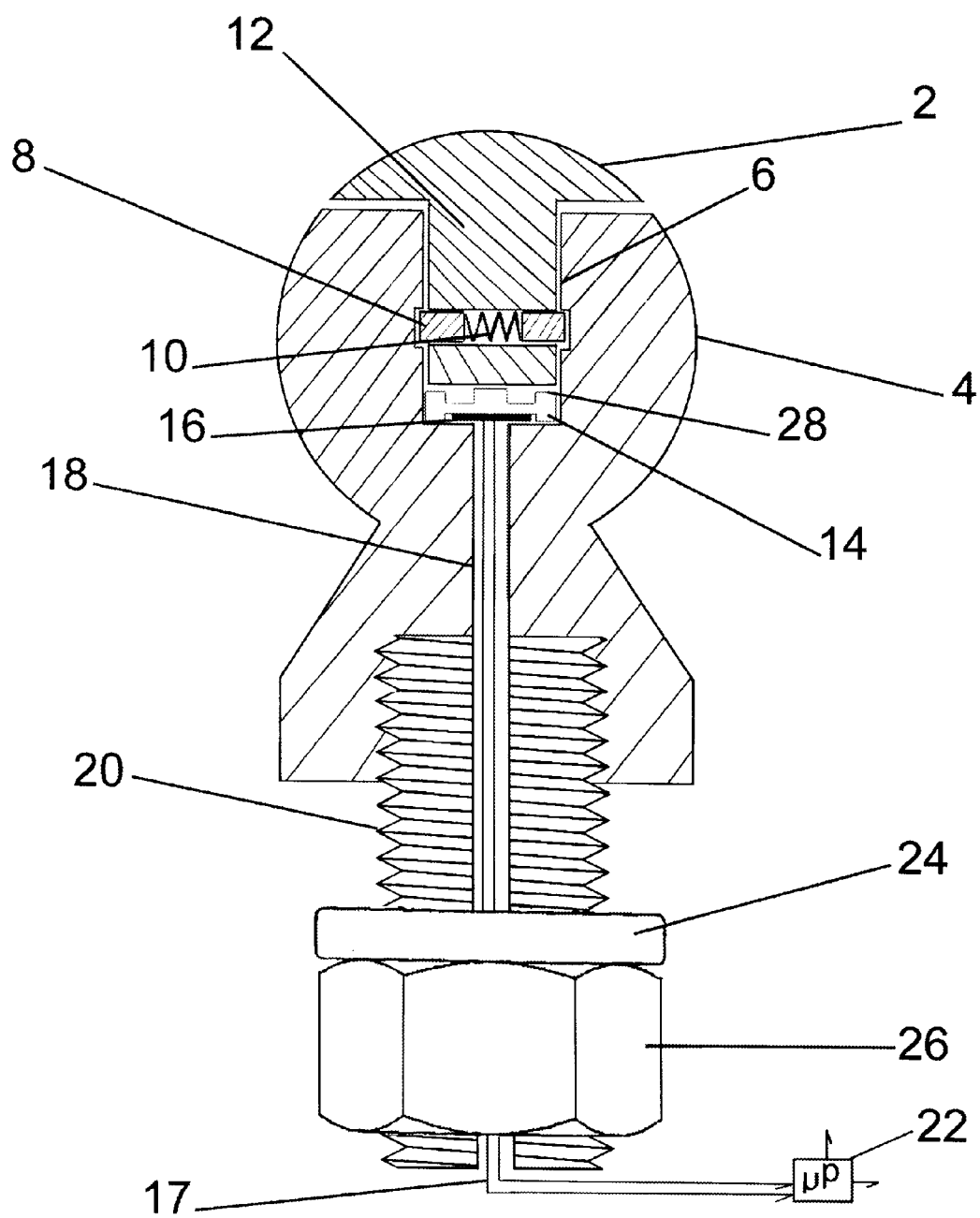
FIG. 1 is a cross-sectional view of the trailer ball-hitch assembly, a drawbar not being shown.

Referring to the drawings where like numerals represent like elements, in particularly FIG. 1, a ball-hitch is seen in a preferred embodiment having a machine-lathed "T"-shaped cap piston 2 seated into a generally spherical machine-lathed upstanding body 4 by means of a passageway 6 extending downward partially through the ball, thus forming a generally spherical upstanding unit. The "T"-shaped cap piston 2 is secured in place by means of a spring loaded retaining mechanism comprising a pair of pins 8 separated by a spring 10. A lower or piston portion 12 located in passageway 6 is seated on top of a conventional precision machine force sensing spring 14. A conventional sensor strain measuring device 16 is adhered to the precision machine force sensing spring 14. A plurality of lead wires 17 are attached by means of an electrically conductive connection to the sensor strain measuring device 16 and exit the ball-hitch by means of a passageway 18 contained therein and passing through a threaded stud bolt 20. The lead wires 17 are in turn attached to a signal processor 22. Completing the modification illustrated in FIG. 1 are a lock washer 24 and a nut 26 which permit removably mounting to a draw bar as seen in the Figures discussed below. As will be seen below, protection against overload is achieved by means of a radial ridge 28 which acts as a stop mechanism on the precision machine force sensing spring 14.

In operation, forces acting in contact with the "T"-shaped piston cap 2 are transferred to precision machined force sensing spring 14. Increases or decreases in force on the precision machined force sensing spring 14 cause minute deflections to occur which are in turn detected by the sensor strain measuring device 16 and transmitted by electrical signal to the signal processing device 22. Protection against overload is achieved by means of a radial ridge 28 acting as a stop mechanism on precision machined force sensing spring 14 when maximum operational deflection occurs.

Figure 2:
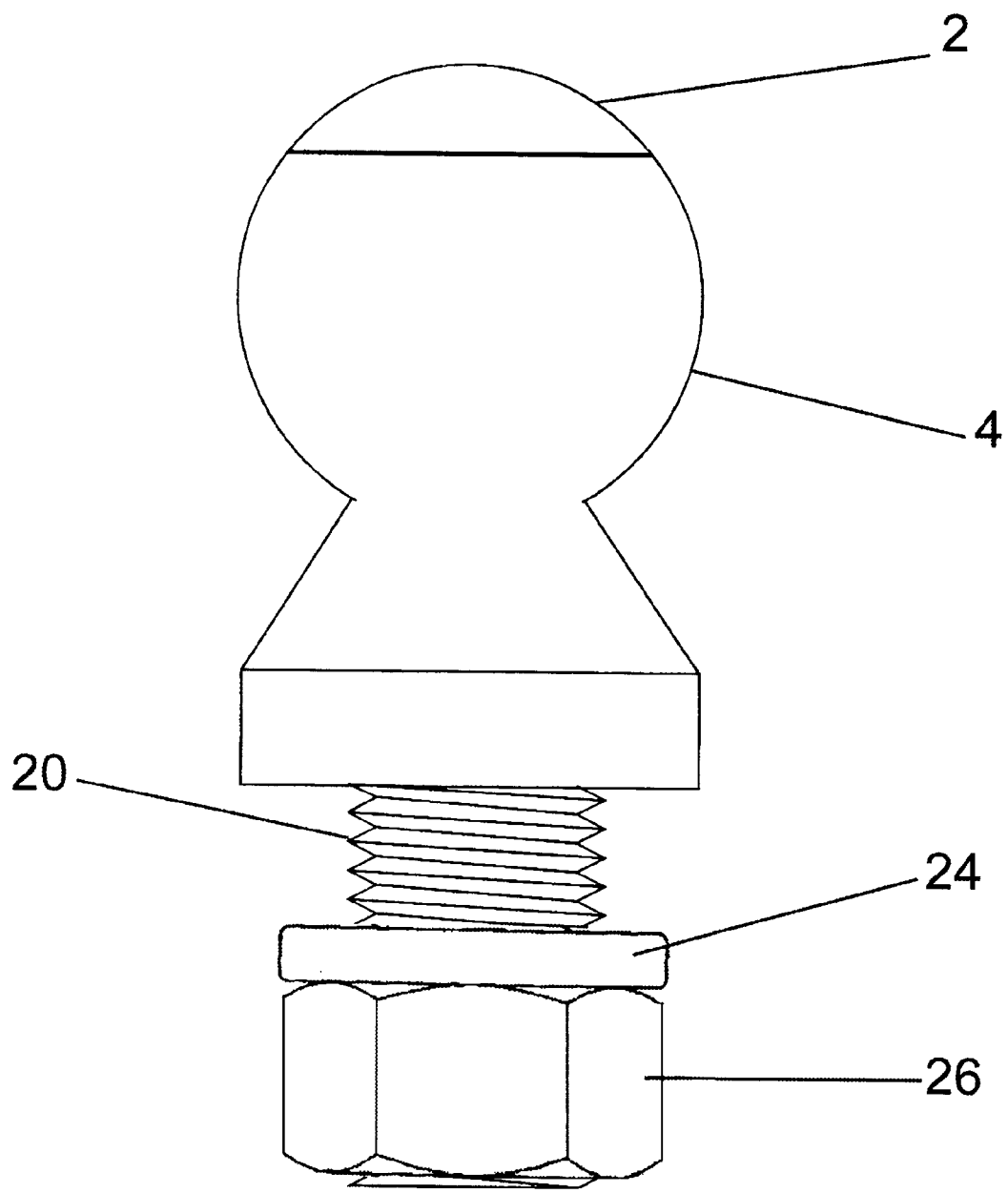
FIG. 2 is an exterior side view of the load sensing trailer ball-hitch assembly of FIG. 1, a drawbar not being shown.

FIG. 2 illustrates an exterior elevational view of the "T"-shaped cap seated in the generally spherical machine-lathed upstanding body 4. As in FIG. 1, threaded stud bolt 20 is shown with lock washer 24 and nut 26 secured.

Figure 3:
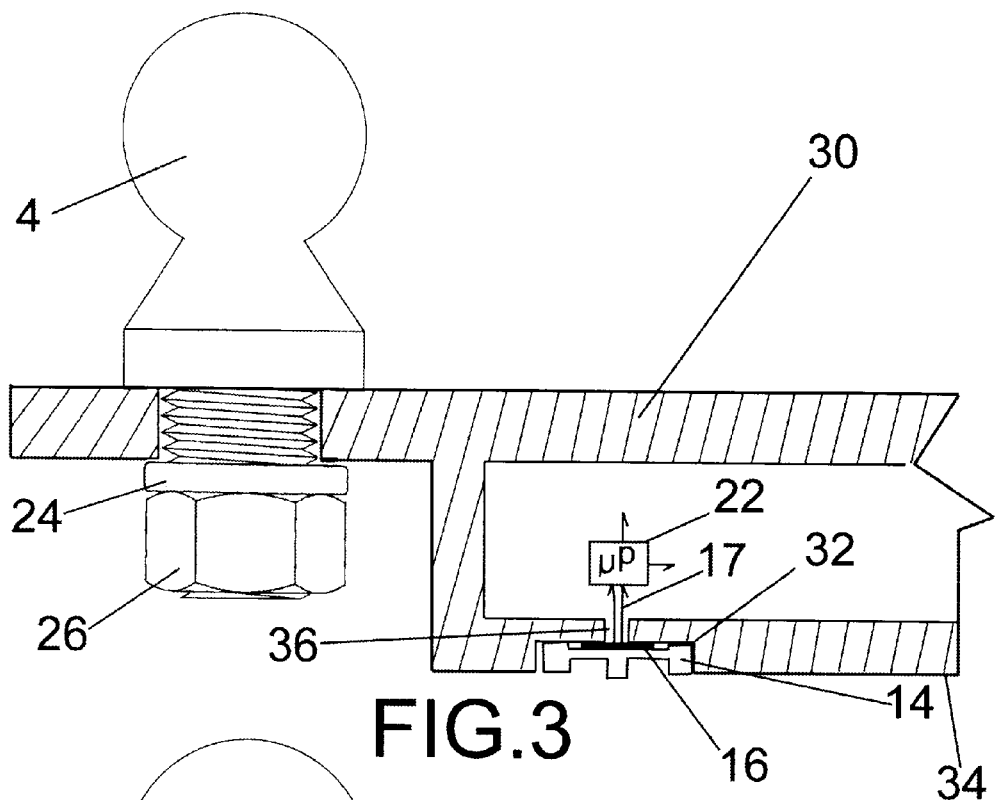
FIG. 3 is an elevational side view of the load sensing trailer ball-hitch assembly mounted on a square tube drawbar which is shown in sectional view.

Referring to FIG. 3, an exterior elevational view of the load sensing ball-hitch is shown mounted on a square tube drawbar 30. The force sensing spring 14 is seated in a recessed channel 32, located on a lower surface 34 of square tube drawbar 30. Sensor strain measuring device 16 is adhered to the precision machine force sensing spring 14. Lead wires 17 are attached by means of an electrically conductive connection to the sensor strain measure device 16. Lead wires 17 are connected to the signal processing device 22 through a passageway 36.

With regard to the operation of the embodiment in FIG. 3, it will be seen that downward forces acting on the ball-hitch mechanism will be transferred to the precision machined force sensing spring 14 and will be detected by the actions and reactions of precision machined force sensing spring in contact with the interior surface of a drawbar receiver (not shown in this figure). Increases or decreases in force will be detected in the same manner as FIG. 1.

Figure 4:
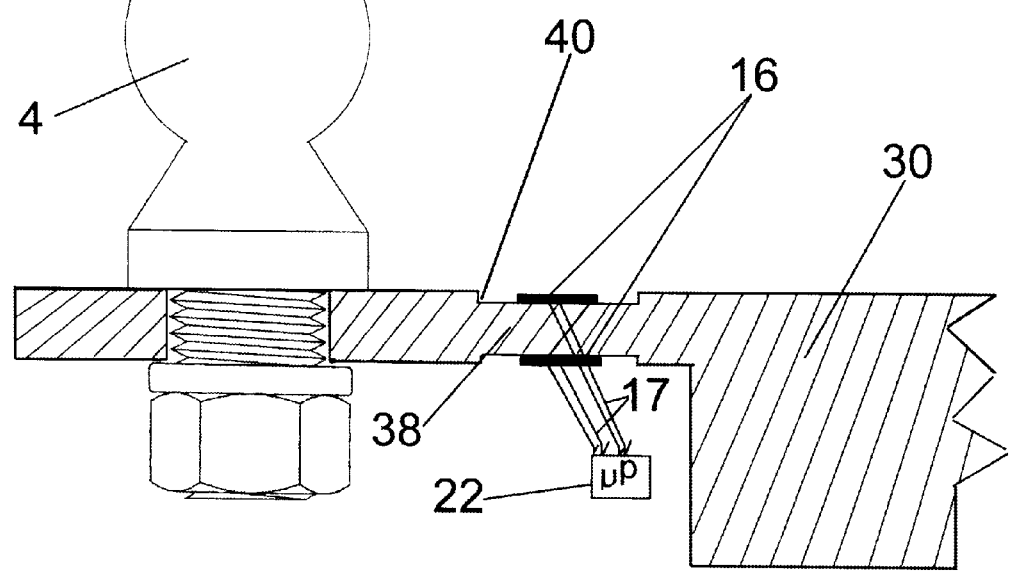
FIG. 4 is an elevational side view of the load sensing trailer ball-hitch assembly mounted on a solid drawbar which is shown in sectional view.

In FIG. 4 there are a pair of strain measuring devices 16 which are adhered directly to the upper and lower surfaces of drawbar beam section 38 and positioned in recessed channels 40. Lead wires 17 are attached by means of an electrically conductive connection to the sensor strain measure devices 16 and to signal processing device 22.

In FIG. 4 forces acting on the ball-hitch drawbar mechanism will create a strain differential on the upper and lower surfaces of the drawbar beam section 38. The strain differential is detected by the sensor strain measuring devices 16 and is transmitted via electronic signal to the signal processing device 22.

Figure 5:
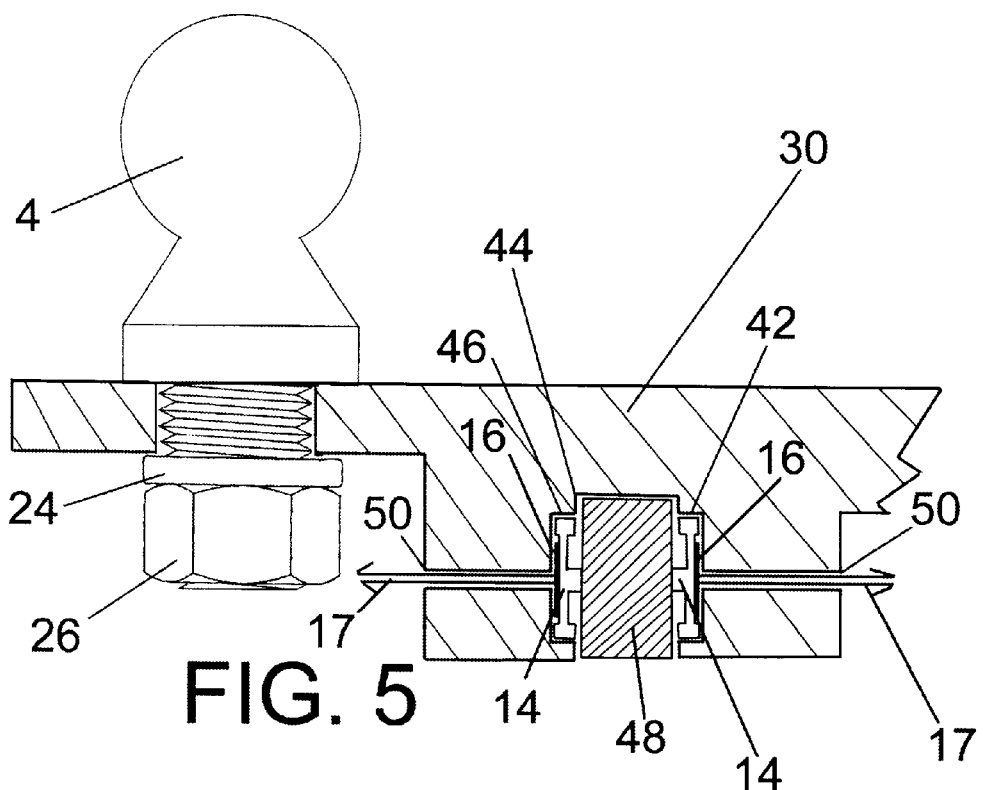
FIG. 5 is an elevational side view of the load sensing trailer ball-hitch mounted on a solid drawbar which is shown in sectional view and having a rectangular retaining pin.

FIG. 5 illustrates an exterior elevational view of the load sensing ball-hitch mounted on a solid drawbar 30. A pair of force sensing springs 14 are mounted in complimentary recess channels 42 and 46 in solid drawbar notched passageway 44. A rectangular retaining pin 48 passes through the solid drawbar 30 by means of the solid drawbar notched passageway 44. The sensor strain measuring device 16 is attached to the precision machine force sensing spring 14. The lead wires 17 are attached by means of an electrically conductive connection to the sensor strained measuring device 16. The lead wires 17 then run to the signal processing device 22 (not shown in this figure) through a passageway 50.

In FIG. 5 forces of acceleration and deceleration are detected by the actions and reactions of the precision machined force sensing springs 14 located in recessed channels 42 and 46 in contact with the rectangular retaining pin 48.

Figure 6:
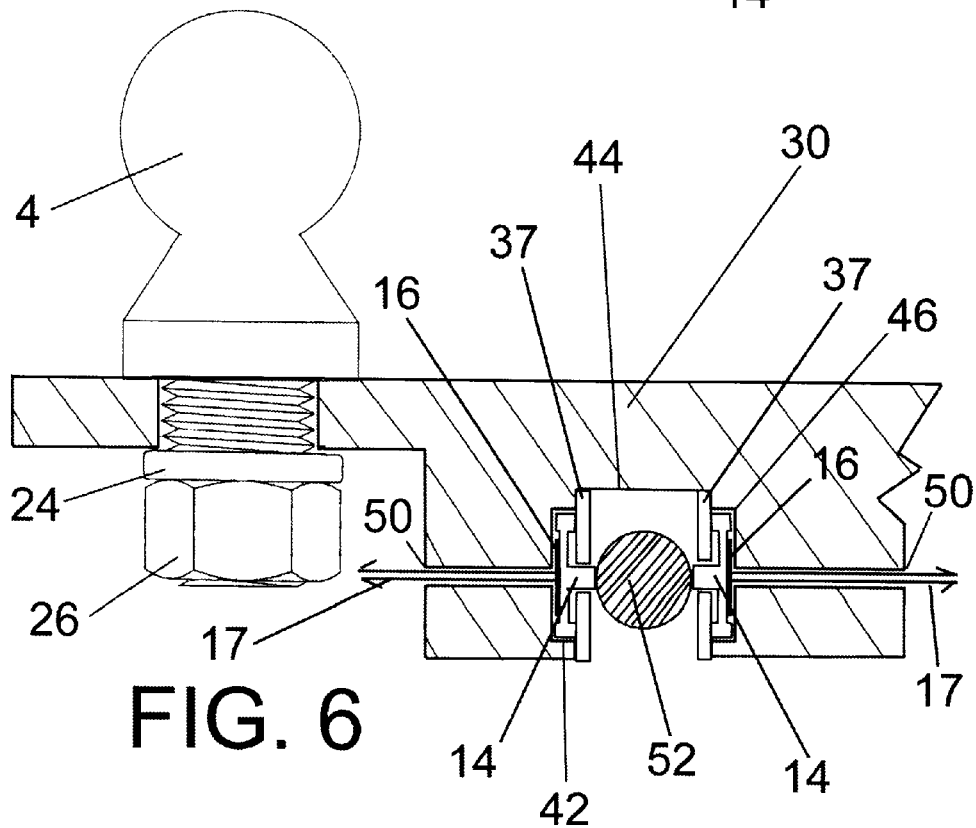
FIG. 6 is an elevational side view of the load sensing trailer ball-hitch mounted on a solid drawbar which is shown in sectional view and having a round retaining pin.

FIG. 6 illustrates an embodiment similar to FIG. 5; however, a rounded retaining pin 52 is substituted for the rectangular retaining pin 34 in FIG. 5. Additional protection against sensing spring overload is provided by cover plates 37.

In FIG. 6, forces of acceleration and deceleration are detected by the actions and reactions of the precision machined force sensing springs 14 in contact with rounded retaining pin 52.

Figure 7:
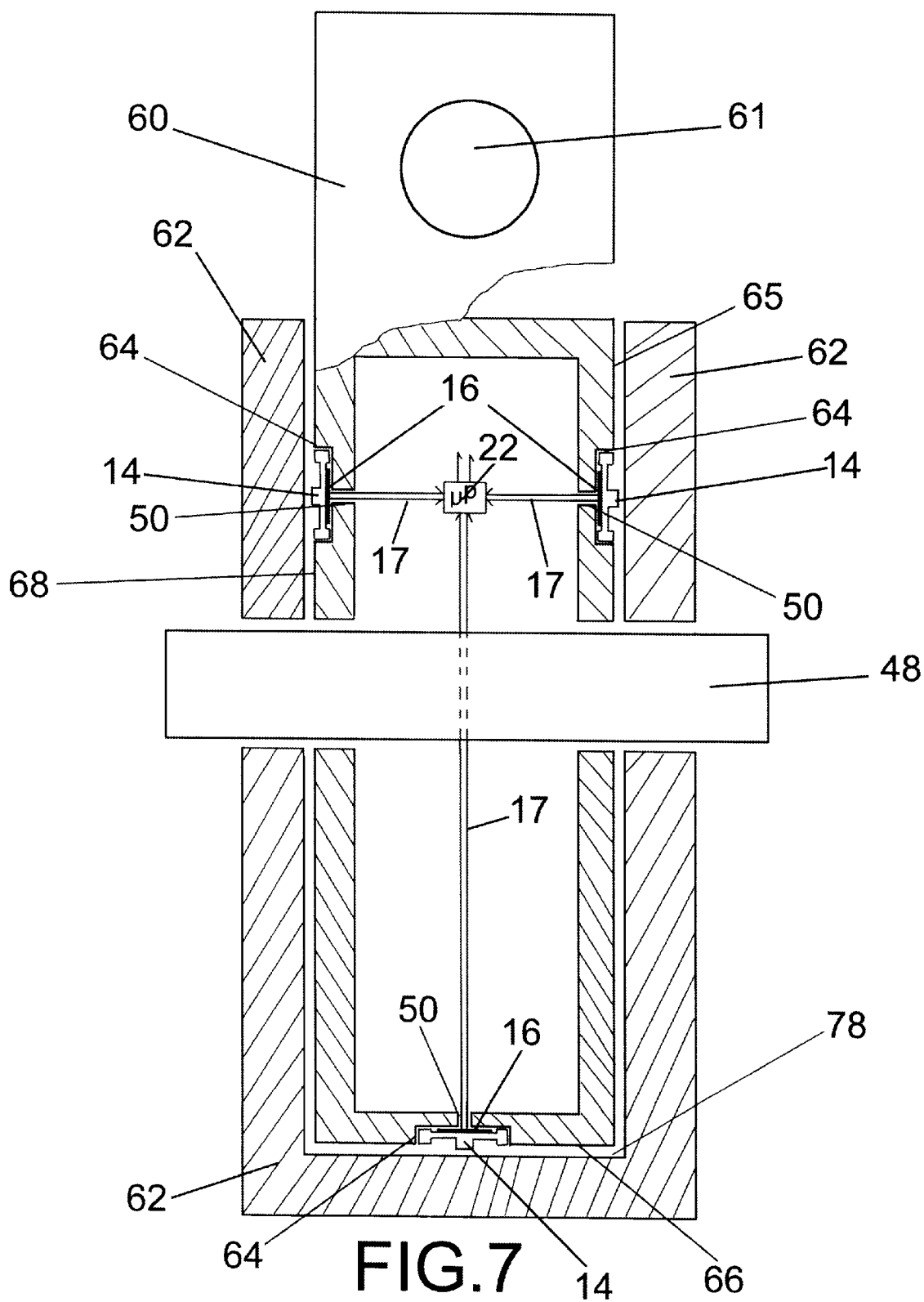
FIG. 7 is a top sectional view of a square tube drawbar inserted in a drawbar receiver.

Referring to FIG. 7 which is a top sectional view of a square tube drawbar 60 seated in a drawbar receiver 62. Ball-hitch mounting hole 61 is shown. A precision machined force sensing spring 14 is seated in a recessed channel 64 located on a forward surface 66 of the square tube drawbar 60. A pair of precision machine force sensing springs 14 are seated in recessed channels 64 located on the lateral exterior surfaces 65 and 68 of the square tube drawbar 60. Sensor strain measuring devices 16 are attached to the precision machined force sensing springs 14. Lead wires 17 are attached by means of electrically conductive connections to the sensor strain measuring devices 16. Lead wires 17 are run to the signal processor device 22 through a plurality of passageways 50.

In FIG. 7, deceleration forces acting on the drawbar mechanism can be determined by the actions and reactions of the sensing springs 14 located on the drawbar forward surface 66 and the drawbar receiver interior surface 78. Lateral forces acting on the drawbar mechanism are detected by the actions and reactions of the sensing springs 14 located on the drawbar lateral exterior surfaces 65 and 68 and the drawbar receiver 62 interior surface.

Figure 8:
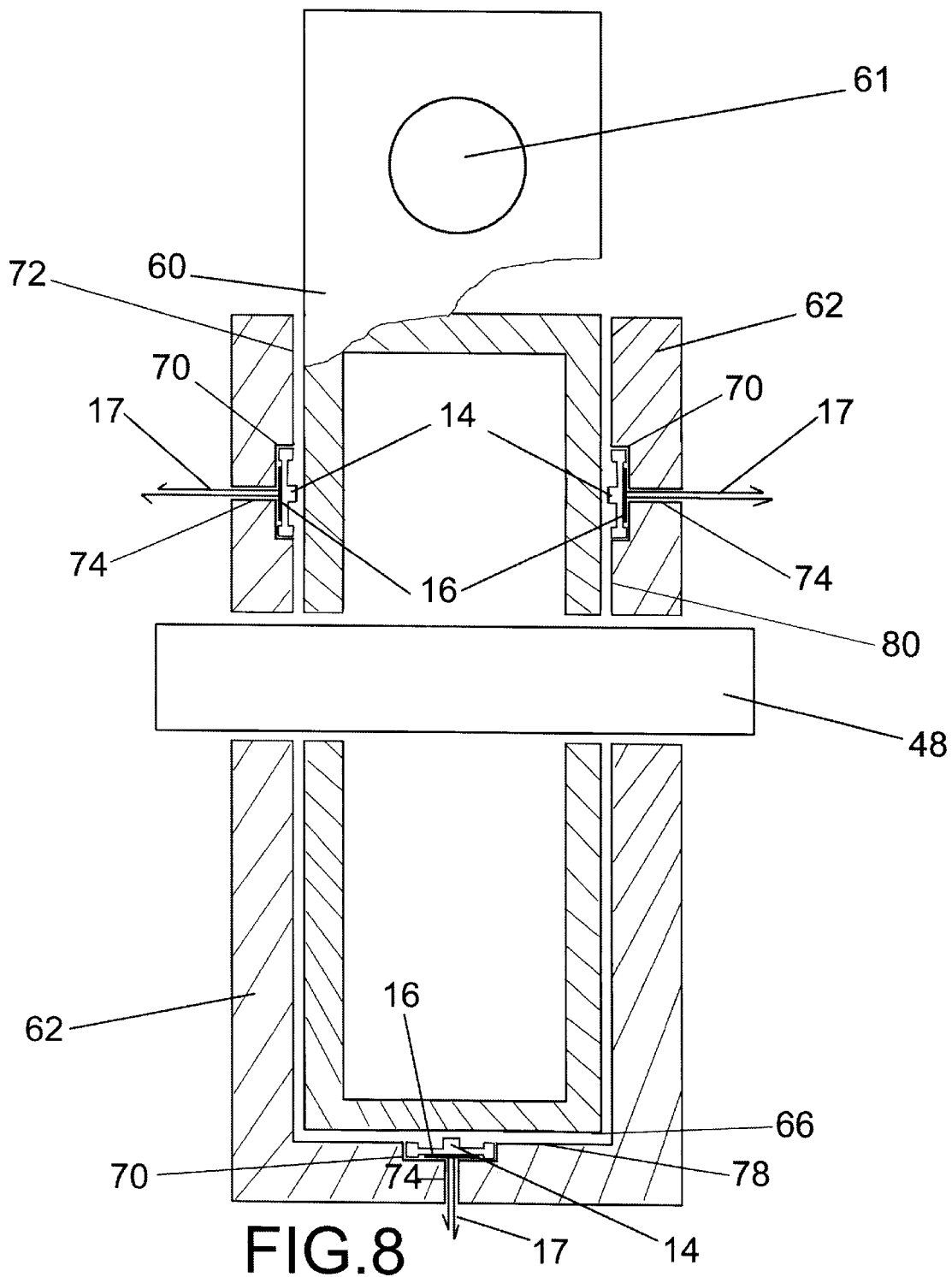
FIG. 8 is a top sectional view of a square tube drawbar inserted in a drawbar receiver.

FIG. 8 is similar to FIG. 7; however, the sensing springs 14 and sensor strain measuring devices 16 are positioned in a plurality of recesses 64 located on respective interior lateral surfaces 72, and 80 of square tube drawbar receiver 62. Lead wires 17 are run to the signal processor 12 (not shown) through a plurality of passageways 74.

Additional sensing spring 14 and strain measuring device 16 are seen in the lower portion of FIG. 8 seated in recessed channel 70 located on the interior forward surface 78 of square tube drawbar receiver 62.

In FIG. 8, deceleration forces acting on the drawbar mechanism can be determined by the actions and reactions of the sensing spring 14 located on the interior forward receiver surface 78 in contact with the forward surface 66 of the drawbar. Lateral forces acting on the drawbar mechanism are detected by the actions and reactions of the sensing springs 14 located on the drawbar receiver lateral interior surfaces 72 and 80 and the drawbar 60 exterior lateral surfaces 65 and 68.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A readily interchangeable load sensing trailer ball hitch, comprising:

a) a shaped ball member readily removably mountable on a vehicle, b) the ball member formed by a large unitary ball portion and a smaller T-shaped cap piston, the cap piston forming a spherical closure on the ball member, the lower ball portion having a passageway therein extending downward partially therethrough and including the T-shaped cap piston movable within the passageway;

c) a force sensing member at the bottom of the passageway between the piston and the interior of the ball member, the piston being in direct contact with the force sensing member;

d) the force sensing member having a force sensing spring extending longitudinally across the passageway, including a stop mechanism and a strain measuring device in contact with the spring, whereby increases and decreases in the force exerted on the ball member are measured therein.

2. The trailer hitch of claim 1, wherein the force sensing member measures vertical movements.

3. The trailer hitch of claim 1, wherein the piston is T-shaped with the force sensing member being positioned at a base of the piston.

* * * * *